July 2, 1963 A. K. H. T. RABENAU 3,096,287
METHOD OF MAKING $Tl_2Te_3$
Filed July 6, 1960
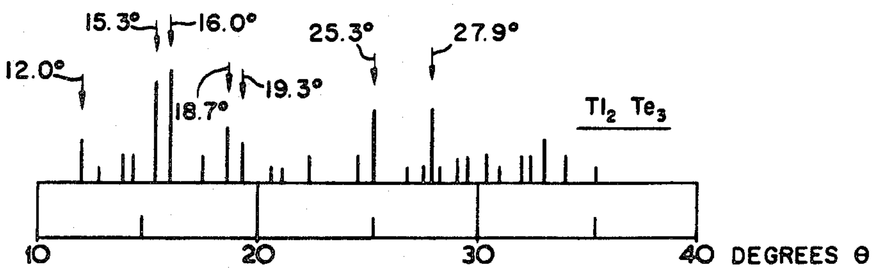
INVENTOR.
A. K. H. T. RABENAU
BY
Frank R. Trifari
AGENT 3,096,287
Patented July 2, 1963

3,096,287

METHOD OF MAKING $Tl_2Te_3$

Albrecht Karl Heinrich Theodor Rabenau, Aachen, Germany, assignor to North American Philips Company, Inc., New York, N.Y., a corporation of Delaware Filed July 6, 1960, Ser. No. 40,999
Claims priority, application Germany July 4, 1959
7 Claims. (Cl. 252—62.3)

This invention relates to a method of making semi-conductive $Tl_2Te_3$ and mixed crystals thereof.

In my prior copending application, Serial No. 826,341, filed July 10, 1959, which relates to a semi-conductor material or a semi-conductor body or a semi-conductor device containing the compound $Tl_2Te_3$ and/or at least one of the isomorphous mixed crystals of this compound, in which, while maintaining the structure, a part of the thallium and/or the tellurium may be replaced by other elements, which application also relates to the manufacture and use of the material in semi-conductor devices, such as thermo-electric devices, in particular Peltier refrigerators, a mode of preparation was described in which the components concerned and/or compounds supplying these components in a mixing ratio suitable for the compound concerned were annealed, if required after having been shaped into the form desired for the body, for a sufficiently long period of time at a temperature below the decomposition temperature of the desired compound in the solid state, until the compound concerned has formed. For the compound $Tl_2Te_3$, the decomposition temperature was found at a temperature below approximately 238° C., at approximately 237° C. Therefore, annealing both for the compound $Tl_2Te_3$ and for the isomorphous mixed crystals of this compound was preferably carried out at a temperature below approximately 238° C., it being pointed out that the decomposition temperature of mixed crystals may differ from that of $Tl_2Te_3$. According to a further aspect of my prior application, annealing is preferably carried out above approximately 150° C., in particular above approximately 180° C., the required annealing time becoming practically inadmissibly long in the case of too low a temperature.

Although the above method as such is suitable for the preparation of $Tl_2Te_3$ and the isomorphous mixed crystals of this compound, a disadvantage is that the conversion into the compound concerned, also in the case of annealing at the higher temperatures in the temperature range below the decomposition temperature, still requires a rather long period, for example a few days.

It is an object of the present invention to provide measures which are easy to perform to reduce the conversion time required for the above method.

Therefore, in a method for preparing a semi-conductor material or a semi-conductor body or a semi-conductor device having a semi-conductor body, containing the compound $Tl_2Te_3$ and/or at least one of the isomorphous mixed crystals of this compound, in which, while retaining the structure, a part of the thallium and/or the tellurium is replaced by other elements, in which the components concerned and/or compounds supplying these components, are annealed, in a mixing ratio suitable for the compound concerned, if required after having been shaped into the form desired for the body, at a temperature below the decomposition temperature of the compound concerned in the solid state for a sufficiently long period of time until the compound concerned has formed, crystal nuclei of a compound of a structure isomorphous with the compound concerned, preferably crystal nuclei of the compound concerned itself, are added, in accordance with the present invention, to the mixture of the components and/or compounds supplying these components, before or during, preferably before, the annealing treatment. The content of crystal nuclei need only be very low, for example 1% by weight.

According to a particularly simple form of this method, the crystal nuclei may be added to the mixture by annealing the mixture beforehand at a temperature which lies only a few degrees above the decomposition temperature, preferably less than approximately 5° C., to form an approximation structure of the compound concerned, which approximation structure causes the formation of crystal nuclei in the mixture when cooling to below the decomposition temperature. In general, an annealing time of approximately 30 minutes is already sufficient. The higher the annealing temperature is chosen, the quicker the approximation structure is formed, but the less favourably it is developed. For example, at an annealing temperature of approximately 10° C. above the decomposition temperature, the effect will be much smaller.

The measure according to the invention may in a simple manner be combined with the particular performances of the mode of preparation described in my prior application, whose disclosure is hereby incorporated by reference into this specification. In my prior application, a method was described in which the components concerned and/or compounds supplying these components are annealed in a finely divided powdered mixture after the powdered mixture has been shaped into the form desired for the body, for example, by compression, below the decomposition temperature to form the compound in question. According to a further aspect of the present invention, the crystal nuclei, when using such a process, are added, in a finely divided form, to the powdered mixture before the annealing. If the mode of preparation is carried out in a manner such that the components concerned and/or compounds supplying these components are melted together and then annealed at a temperature below the decomposition temperature to form the compounds concerned, the addition of the crystal nuclei according to a further characteristic feature of the present invention may be effected in a manner such that the crystal nuclei in powdered form are added to the mixture during the cooling following the melting at least in a temperature range above the decomposition temperature and following the reaching of the decomposition temperature.

In order that the invention may be readily carried into effect, it will now be described, by way of example, with reference to three examples.

*Example I*

A preparation consisting of a mixture of the components thallium and tellurium in the composition corresponding to the stoichiometric compound $Tl_2Te_3$, was melted at approximately 350° C. in an argon atmosphere in a closed quartz vessel. Then the preparation was cooled in about half an hour to a temperature of approximately 239° C. lying only a few degrees above the decomposition temperature and then kept at this temperature for approximately one hour. Then the preparation consists of TlTe and a melt. An approximation structure of $Tl_2Te_3$ is formed in the melt. This proves to be the case, for example, because when quenching the preparation in ice-water already crystal nuclei of $Tl_2Te_3$ are found, which nuclei formation is not found under these circumstances when cooling continuously, for example in air, without annealing at a temperature lying only a few degrees above the decomposition temperature. If the mixture is not quenched but kept at 235–236° C. for 2 to 3 hours after the annealing at 239° C., a preparation is obtained entirely converted into $Tl_2Te_3$. Without leaving the scope of the invention, it is naturally also possible not to carry out the annealing below the decomposition temperature right after the pre-annealing to form the approximation structure but to carry out this annealing below the decomposition temperature only afterwards, for example after quenching.

*Example II*

A preparation of approximately 50 gms. of the stoichiometric quantities of Tl and Te corresponding to $Tl_2Te_3$ was melted, while stirring, in a tube closed at one end under argon at a temperature of 300° C. to 350° C. Then the whole was cooled and on reaching the temperature of approximately 250° C. powdered annealed $Tl_2Te_3$ as prepared in Example I or one of the examples set forth in my prior application was constantly added, via a glass capillary, to the preparation during the further cooling. Before reaching the decomposition temperature, the sample consists of TlTe and melt. When reaching the decomposition temperature of $Tl_2Te_3$ (at approximately 237° C.), the addition of $Tl_2Te_3$ powder is discontinued. The cooling from 250° C. to 237° C. was done in about twenty minutes and during this time about 0.5 grams $Tl_2Te_3$ was added. At the decomposition temperature, the peritectic reaction TlTe plus melt $\rightarrow Tl_2Te_3$ spontaneously occurs owing to the presence of the nuclei. Now it is sufficient to anneal 2 to 3 hours to complete the reaction. Preferably, the temperature at which the addition of nuclei is started lies below the peritectic point of the liquidus curve which lies at approximately 280° C.

*Example III*

A stoichiometric quantity of TlTe and tellurium corresponding to the composition $Tl_2Te_3$ was ground together with 1% by weight of annealed $Tl_2Te_3$, as a result of which a finely divided powdered mixture was obtained. From this mixture, a pellet having a diameter of 22 mms. and a height of 8 to 10 mms. was compressed under a pressure of approximately 1 ton/cm$^2$. Then the pellet was annealed at approximately 230° C. for approximately 15 hours, which was sufficient to obtain a substantially complete conversion. It appeared from a comparative experiment that under the same conditions, without the addition of $Tl_2Te_3$ crystal nuclei, a substantially complete conversion was reached only after a treatment of approximately 3 days.

It is further noted that the present invention is by no means restricted to the above examples and that it may be applied in an analogous manner to the manufacture of $Tl_2Te_3$ with a content of activators or with deviations from stoichiometry and also to the isomorphous mixed crystals of $Tl_2Te_3$, in which the thallium and/or the tellurium may be replaced partially, for example by gallium or indium and by sulphur or selenium respectively. In addition, it is clear that the annealing below the decomposition temperature to increase the reaction speed is carried out at not too low a temperature, preferably above approximately 150° C. and even above approximately 180° C.

The sole figure of the drawing is a Debye X-ray diffraction powder analysis generally obtained when the semiconductor material to which the invention pertains is present, as is described in detail in the said copending application Serial No. 826,341. The analysis of the material was by means of X-ray powder diffractometry according to the assymetrical method of Straumanis. The X-ray apparatus used was a Müller-Mikro 101 with stabilized voltage. The analyzing radiation was Cu k$\alpha$ filtered by nickel; the radius of the film chamber was 57.3 mm.; the exposure time was 3 hours at an X-ray tube voltage of 35 kV and tube current of 25 mA. In the figure, the estimated values of the radiation beam intensities are plotted linearly in arbitrary units along the ordinate while the angle of deflection in degree $\theta$ of the diffracted beam is plotted along the abscissa. The sequence of lines shown is characteristic of the compound $Tl_2Te_3$ or of mixed crystals thereof. The stronger lines indicated by arrows in the figure can be used to detect the presence of the compound in accordance with the invention or mixed crystals thereof from an X-ray diagram. The semiconductor compound will also in general exhibit semiconductive properties, in contrast to the properties commonly exhibited by metals, for instance, a low thermal conductivity, a high thermo-electric power, and an electrical conductivity in the semiconductor range.

As is evident from the said prior copending application, not only is the method of the invention applicatible to the compound $Tl_2Te_3$, but also to isomorphous mixed crystals resulting from this compound. The formation of mixed crystals is a known, generally-used process in semiconductor technology for the purpose of conversion of a compound which in a certain respect is particularly suitable for a special purpose into a mixed crystal which, in addition, has other useful properties for this special purpose. Thus, for example, for use in Peltier refrigerators, part of the thallium of the compound may be replaced by gallium or indium, and part of the tellurium by sulphur or selenium in order to reduce the thermal conductivity. Obviously, the formation of mixed crystals is not restricted to these replacements; the thallium might also be replaced with up to, for instance, 25 atomic percent of bismuth, lead or mercury. Furthermore the term "compound" obviously is not to be understood to mean the precisely stoichiometric compound $Tl_2Te_3$ only, but, in the manner usual in semiconductor technology, also includes any deviations from the precise stoichiometric composition which may occur within the phase limits and furthermore the additional introduction of active imperfections, more particularly, impurity atoms. These deviations from the stoichiometric composition, for example, by the incorporation of a large relative quantity of thallium or tellurium, and the additional doping with impurity atoms such, for example, as, on the one hand, copper or silver and, on the other hand, a halogen such as iodine, may be used to modify the conductivity type or the conductivity or both of the body. An X-ray examination of the mixed crystals may show small deviations in the line intensities and line spacings relative to the line spectrum of the drawing. However, the characteristic line sequence is always maintained.

What is claimed is:

1. In the method of making a semiconductor material comprising a single phase containing thallium and tellurium having a crystal structure isomorphous with that of $Tl_2Te_3$ and exhibiting a characteristic X-ray diffraction pattern containing substantially the line sequence indicated by the arrows in the graph of the accompanying drawing, wherein the abscissa is in degrees $\theta$ and the ordinate indicates relative line intensity, said single phase possessing semiconductive properties making it suitable for use in semiconductor devices, wherein the structure-forming materials containing thallium and tellurium are heated and reacted at a temperature below the decomposition temperature of the solid-state single phase for a period of time sufficient to form the said single phase, the improvement comprising, in order to reduce the heating time required to convert the structure-forming materials to the desired said single phase, carrying out the heating and reacting step in the presence of crystal nuclei containing thallium and tellurium and having a crystal structure isomorphous with that of said single phase.

2. In the method of making a semiconductor material comprising a single phase containing thallium and tellurium having a crystal structure isomorphous with that of $Tl_2Te_3$ and exhibiting a characteristic X-ray diffraction pattern containing substantially the line sequence indicated by the arrows in the graph of the accompanying drawing, wherein the abscissa is in degrees $\theta$ and the ordinate indicates relative line intensity, said single phase possessing semiconductive properties making it suitable for use in semiconductor devices, wherein the structure-forming materials containing thallium and tellurium are heated and reacted at a temperature below the decomposition temperature of the solid-state single phase for a period of time sufficient to form the said single phase, the improvement comprising, in order to reduce the heating time required to convert the structure-forming materials to the desired said single phase, prior to the heating and reacting step adding to the structure-forming materials crystal nuclei containing thallium and tellurium and having a crystal structure isomorphous with that of said single phase, and thereafter carrying out the said heating and reacting step until the conversion is effected.

3. A method as set forth in claim 2 wherein the crystal nuclei have the same composition as that of the said single phase.

4. A method as set forth in claim 2 wherein the structure-forming materials and added crystal nuclei are in finely-divided powdery form.

5. A method as set forth in claim 4 wherein the powdery materials are compressed to form a body before the heating and reacting step.

6. In the method of making a semiconductor material comprising a single phase containing thallium and tellurium having a crystal structure isomorphorus with that of $Tl_2Te_3$ and exhibiting a characteristic X-ray diffraction pattern containing substantially the line sequence indicated by the arrows in the graph of the accompanying drawing, wherein the abscissa is in degrees $\theta$ and the ordinate indicates relative line intensity, said single phase possessing semiconductive properties making it suitable for use in semiconductor devices, wherein the structure-forming materials containing thallium and tellurium are melted and the melt is cooled below the decomposition temperature of the solid-state single phase and heated and reacted at the latter temperature for a period of time sufficient to form the said single phase, the improvement comprising, in order to reduce the heating time required to convert the structure-forming materials to the desired said single phase, while cooling the melt and before the decomposition temperature is reached adding to the materials crystal nuclei, in powdered form, containing tellurium and thallium and having a crystal structure isomorphous with that of said single phase, and thereafter carrying out the heating and reacting step.

7. In the method of making a semiconductor material comprising a single phase containing thallium and tellurium having a crystal structure isomorphous with that of $Tl_2Te_3$ and exhibiting a characteristic X-ray diffraction pattern containing substantially the line sequence indicated by the arrows in the graph of the accompanying drawing, wherein the abscissa is in degrees $\theta$ and the ordinate indicates relative line intensity, said single phase possessing semiconductive properties making it suitable for use in semiconductor devices, wherein the structure-forming materials containing thallium and tellurium are melted and then the melt cooled below the decomposition temperature of the solid-state single phase and heated and reacted at the latter temperature for a period of time sufficient to form the said single phase, the improvement comprising, in order to reduce the heating time required to convert the structure-forming materials to the desired said single phase, maintaining the temperature of the materials just a few degrees above the said decomposition temperature to promote the formation therein of crystal nuclei containing tellurium and thallium and having a crystal structure isomorphous with that of said single phase, and then carrying out the heating and reacting step.

References Cited in the file of this patent

Pelabon: Chimie Physique etc., Comptes Rendus, Academie des Sciences, vol. 145, July 1907, pages 118–121.

Bridgman: Certain Physical Properties of Single Crystals etc., Proc. Am. Acad. Arts Sci., vol. 60, No. 6, Oct. 1925, pages 303–383.